May 26, 1925.

F. W. HORSTMANN

CALIPER

Filed Feb. 16, 1923

INVENTOR.
FREDERICK W. HORSTMANN.
BY Richard B. Owen
ATTORNEY.

May 26, 1925.
F. W. HORSTMANN
CALIPER
Filed Feb. 16, 1923
1,539,356
2 Sheets-Sheet 2
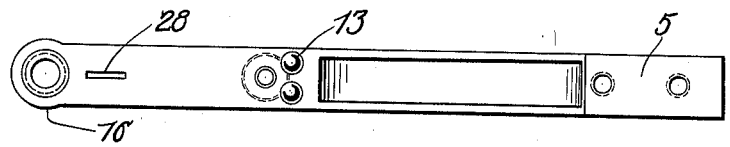
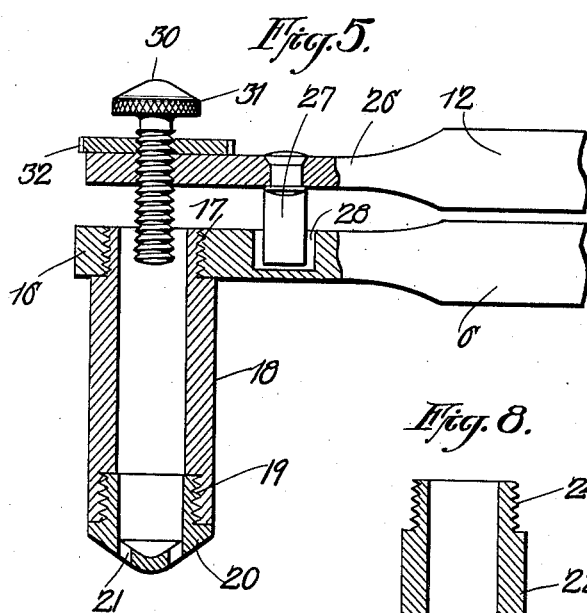
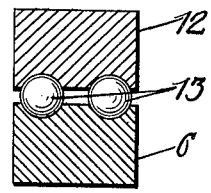
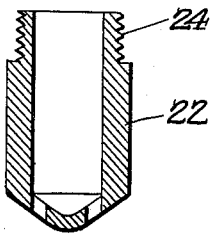
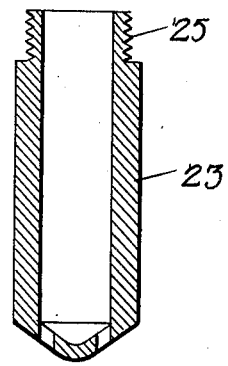
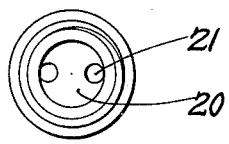
INVENTOR.
FREDERICK W. HORSTMANN.
BY
Richard B. Owen
ATTORNEY.

Patented May 26, 1925.

1,539,356

UNITED STATES PATENT OFFICE.

FREDERICK W. HORSTMANN, OF IRVINGTON, NEW JERSEY.

CALIPER.

Application filed February 16, 1923. Serial No. 619,502.

*To all whom it may concern:*

Be it known that I, FREDERICK W. HORSTMANN, a citizen of the United States, residing at Irvington, in the county of Essex and State of New Jersey, have invented certain new and useful Improvements in Calipers, of which the following is a specification.

This invention relates to measuring instruments and more particularly to a novel and improved indicating caliper designed for inside measurement work for tube boring and the like.

The primary object of my invention is the provision of an indicating caliper and measuring device wherein the contact points may be varied and adjusted for the particular work to be measured including indicating means for registering the size of the particular bore so that the machinist may be guided in his work.

One of the objects of my invention is the provision of an indicating caliper wherein the contact points may be not only removable, and replaceable, but may be set to a certain and predetermined position so that the accuracy of a number of pieces of work may be quickly and expeditiously determined upon inspection.

I accomplish the above objects and others which will become more apparent as the description proceeds and when taken in connection with the accompanying drawings, showing a preferred embodiment of my invention, wherein—

Figure 4 is a top plan of the lower or stationary arm.

Figure 5 is an enlarged view showing the ends of the arms in section and the contact point.

Figure 6 is a sectional view showing the contact bearings between the stationary and the movable arms.

Figure 7 is a plan of the removable contact points and

Figures 8 and 9 are sectional views showing various sized replaceable contact points for the stationary arm.

Figure 1:
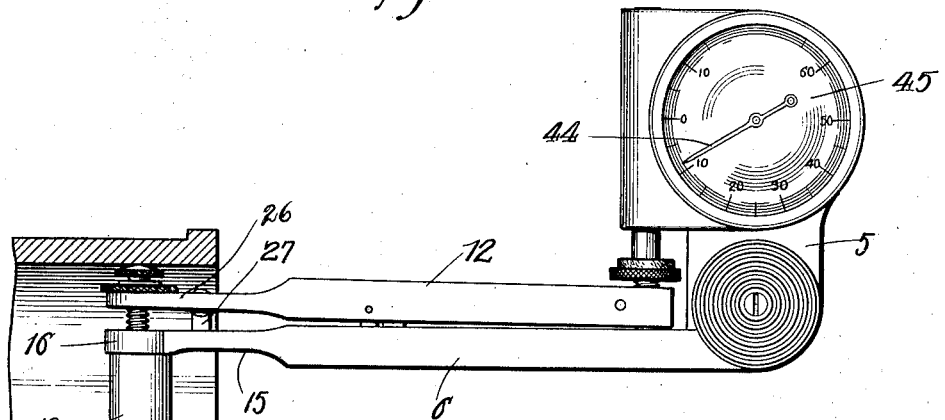
Figure 1 is a side view showing the indicating caliper and its method of use in a tube or bore.

Referring now to the drawings wherein like reference characters designate corresponding parts throughout the several views, 5 designates the indicator body to which a stationary arm 6 is secured by countersunk screws or bolts 7, 8, so that the stationary arm extends at right angles to the body 5 above referred to. The said arm 6 is provided with an annular recess 9 which receives the head 10 of a connecting pin 11 which is swiveled at 11$^a$ and provided with a resilient spring bearing against the head and the stationary arm, so as to tightly draw and keep the respective arms together about the fulcrum bearing 13. The respective arms 6 and 12 are each provided with opposed grooves to receive the said ball bearings 13 which maintain said arms in spaced relation as clearly shown by Figures 1, 2 and 6 of the drawings. The body portion of the arm 6 is preferably grooved as indicated at 14 so as to decrease its weight, it being observed that the outer end 15 of said arm is also of reduced thickness and terminates in an annular apertured head 16 threaded as at 17 to receive what I term a contact barrel 18 subsequently to be referred to.

The barrel 18 is also threaded at its lower end 19 to receive a threaded contact head 20, the latter being provided with apertures 21 to permit of the insertion of an instrument whereby said head 20 may be tightly secured to the barrel 18. By reason of this construction it will be readily seen that various size or length barrels 22, 23 may be utilized with an instrument of this type and the latter may be either threaded into the annular head 16 of the stationary arm 6, or to the lower end of the barrel 18, the upper end of each of the barrels 22 and 23 being threaded as indicated at 24 and 25 for the obvious purpose.

The upper or movable arm 12, above referred to, is also reduced in thickness at its outer end as indicated at 26 and adjacent the extreme outer end thereof, I have provided a countersunk element 27, the lower end of which is permitted to move in a vertical recess 28 formed in the stationary arm 6 and prevents lateral movement of one arm with respect to the other. The reduced portion 26 of the movable arm 12 is provided with an aperture near the outer extreme end thereof to receive an adjustable threaded contact head 30 having a knurled portion 31 and a knurled lock washer 32 for securing the contact head 30 in position when the same has been once set.

Figure 2:
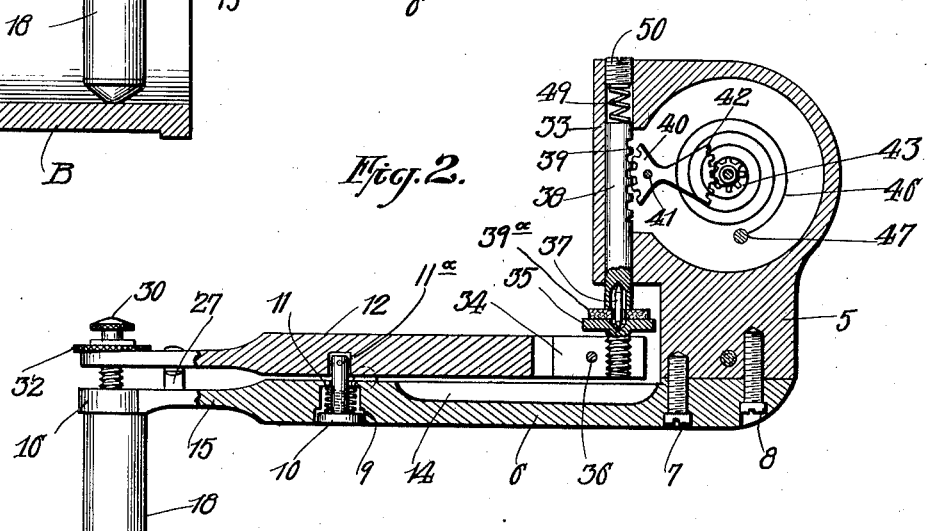
Figure 2 is a side view of the caliper with certain parts in section and showing the dial or indicating operating mechanism.
Figure 3:
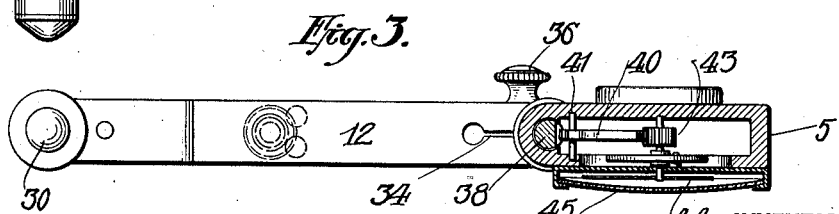
Figure 3 is a plan, the dial and indicating mechanism being shown in section.

Reference being had to Figures 1 and 2 of the drawings, it will be observed that the movable arm 12 is somewhat shorter in length than the arm 6, the inner end of said arm 12 lying in spaced relation with the indicator body and beneath the side extension 33 thereof for a purpose now to be described. The inner end of the arm 12 is provided with a slot 34 communicating with a threaded aperture in which a knurled adjusting screw 35 is positioned which adjusting screw is held and locked by the transversely extending screw 36 passing through the recess or split portion 34 of the said arm 12. The head of the adjusting screw 35 is centrally grooved to receive the lower end of a centering pin 37 extending upwardly into a recess formed in the lower end of a stem 38, a dust ring 39ª being provided to prevent the admission of any foreign matter that might otherwise affect the proper position of the centering pin with respect to the adjusting nut and the stem 38 above referred to. The spring on the connecting pin 11 above referred to also keeps the pin 37 tight against the plunger or stem 38 and screw 35 which is very essential for accurate use of the tool.

The stem 38 is provided with rack teeth 39 which cooperate with a segmental rack arm 40 pivoted as at 41, said rack arm 40 also having rack teeth 42 which engage a pinion 43 for operating the indicating pointer 44 over the graduated dial 45, which pointer is controlled by the spring 46, one end of which is secured as at 47 in the manner clearly shown by Figure 2 of the drawing. The upper end of the stem 38 bears against a small spring 49 held in position by a countersunk screw 50 in the top of the indicating body.

In the actual use of the caliper, it will be seen that the contact barrel 18 which is replaceable in the manner indicated and having a curved head 20 constitutes one of the contact points and that the adjustable contact screw 30 the other. After the said contact points have been set, when the instrument is inserted within the bore of a tube, as indicated at B, the arm 12 will be rocked on its pivot 11 and as the inner end of said arm moves upwardly, the stem 38 will actuate the segment arm 40 thus rotating the pinion 43 to actuate the indicating pointer 44 across the graduated dial so as to give the measurement of the particular piece of work. On the other hand, the adjusting nut 35 permits of the preliminary adjustment of the pointer to position on the scale so that when the caliper is inserted in a particular piece of work, any variation from the set position of the pointed will be indicated with an extreme degree of accuracy.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. An inside indicating caliper comprising a stationary arm having an indicator supporting body and an indicator, a movable arm fulcrumed on the stationary arm to actuate the indicator, means for adjusting said movable arms relatively to said stationary arm thereby setting the indicator to a predetermined position, and work engaging contact means carried by the respective arms for rocking the movable arm to determine the calibration of the work.

2. An inside indicating caliper comprising a stationary arm having an indicator, a movable arm fulcrumed on the stationary arm to actuate the indicator, means for setting the indicator to various positions by the adjustment of the movable arm relative to said stationary arm, and work engaging contact means carried by the respective arms for rocking the movable arm to determine the calibration of the work.

3. An inside indicating caliper comprising a stationary arm having an indicator, a movable arm fulcrumed on the stationary arm, means for adjusting said movable arm relatively to said stationary arm to set the indicator to various predetermined positions, means for locking said adjustable means, and work engaging adjustable contact elements carried by the respective arms to determine the calibration of the work.

4. An inside indicating caliper comprising a stationary arm having an indicator, a sliding plunger, for operating the indicator, an arm fulcrumed on the stationary arm, means for adjusting said fulcrumed arm relatively to the said stationary arm to engage the plunger, and adjustable work engaging contact elements carried at the opposite end of each of the respective arms to determine the calibration of the work.

5. An inside indicating caliper comprising a stationary arm having an indicator supporting body, a sliding plunger having teeth thereon movable in the said body, a pivoted segmental rack arm cooperating with the plunger, a spring controlled pointer and pinion engaging the rack arm, an arm fulcrumed for movement on the stationary arm, means carried by the movable arm for actuating the plunger, and adjustable work engaging contact elements secured in the respective arms for determining the calibration of a piece of work.

6. An inside indicating caliper comprising a stationary arm having an indicator supporting body and an indicator, a movable arm lying substantially in parallel relation with the stationary arm and fulcrumed thereon, means carried at one end of the movable arm to actuate the indicator, a contact element secured in the opposite end of the movable arm, and a replaceable contact barrel secured in the corresponding end of the stationary arm and cooperating with the first mentioned contact element for determining the calibration of a piece of work.

7. An inside indicating caliper comprising a stationary arm having an indicator supporting body and an indicator, a slidable plunger in said body for actuating the indicator, an arm fulcrumed for movement on the stationary arm including an adjustable element secured at one end thereof to engage one end of the plunger to set the indicator to a predetermined position and replaceable contact elements on the respective arms.

8. An inside indicating caliper comprising a stationary arm having an indicator supporting body and an indicator, an arm fulcrumed for movement on the stationary arm, including an adjustable element secured at one end thereof for setting the indicator to a predetermined position, a contact barrel secured at one end of the stationary arm and an adjustable contact element secured in the corresponding end of the movable arm.

9. An inside measuring instrument comprising a casing having an indicating dial, a stationary arm secured to the bottom of said casing, an arm normally parallel with said stationary arm fulcrumed thereon, contact elements carried at corresponding ends of the respective arms, and means within the casing cooperating with the opposite end of the movable arm and dial to register the calibration of a bore.

In testimony whereof I affix my signature.

FREDERICK W. HORSTMANN. [L. S.]